United States Patent [19]

Sato

[11] Patent Number: 5,289,448

[45] Date of Patent: Feb. 22, 1994

[54] ROTATION CONTROL APPARATUS FOR USE WITH RECORDING MEDIUM

[75] Inventor: Kouichi Sato, Fujimi, Japan

[73] Assignee: Asahi Kogaku Kogyo Kabushiki Kaisha, Tokyo, Japan

[21] Appl. No.: 967,935

[22] Filed: Oct. 28, 1992

Related U.S. Application Data

[63] Continuation of Ser. No. 769,052, Dec. 26, 1990, abandoned, which is a continuation of Ser. No. 238,532, Aug. 31, 1988, abandoned.

[30] Foreign Application Priority Data

Aug. 31, 1987 [JP] Japan .................... 62-217534

[51] Int. Cl.$^5$ .................................. G11B 19/24
[52] U.S. Cl. .................... 369/50; 358/338; 360/73.03
[58] Field of Search .......... 369/50; 360/73.03, 35.1; 358/320–332, 337, 338, 342, 906, 909

[56] References Cited

U.S. PATENT DOCUMENTS

| | | | |
|---|---|---|---|
| 4,409,627 | 10/1983 | Eto | 358/336 |
| 4,638,375 | 1/1987 | Motoyama | 369/50 |
| 4,710,825 | 12/1987 | Okita | 358/338 |

FOREIGN PATENT DOCUMENTS 62-112483  5/1987  Japan .

OTHER PUBLICATIONS

Patent Abstracts of Japan, vol. 11, No. 325, [E551], Oct. 22, 1987, & JP62-112483.

*Primary Examiner*—W. R. Young
*Attorney, Agent, or Firm*—Sandler, Greenblum & Bernstein

[57] ABSTRACT

A rotation control apparatus provides servo control over a recording medium, which allows information signals to be read thereto or written therefrom. The apparatus is capable of effecting proper recording or reproduction even immediately after switching of modes. A motor imparts rotary motion to a recording medium; a pulse generator is arranged to detect the rotation of the recording medium and then to output a pulse of frequency proportional to the rotational speed of the recording medium; a servo circuit receives a reference pulse and the pulse output from the pulse generator and then controls the motor to rotate so that the phase difference between the reference pulse and the pulse output from the pulse generator is constant. An internal vertical synchronizing signal generating circuit having a reset terminal, is arranged to supply an internal vertical synchronizing signal of predetermined frequency to the servo circuit as the reference pulse if no reset signal is supplied to the reset terminal, or, if a reset signal is supplied to the reset terminal, to cause the phase of the internal vertical synchronizing signal to coincide with the phase of the reset signal. An external vertical synchronizing signal separating circuit is arranged to receive a composite video signal and to separate an external vertical synchronizing signal from the composite video signal, thereby outputting the external vertical synchronizing signal. A reset-signal supplier supplies the separated external vertical synchronizing signal to the reset terminal of the internal-vertical-synchronizing-signal generating circuit.

9 Claims, 2 Drawing Sheets

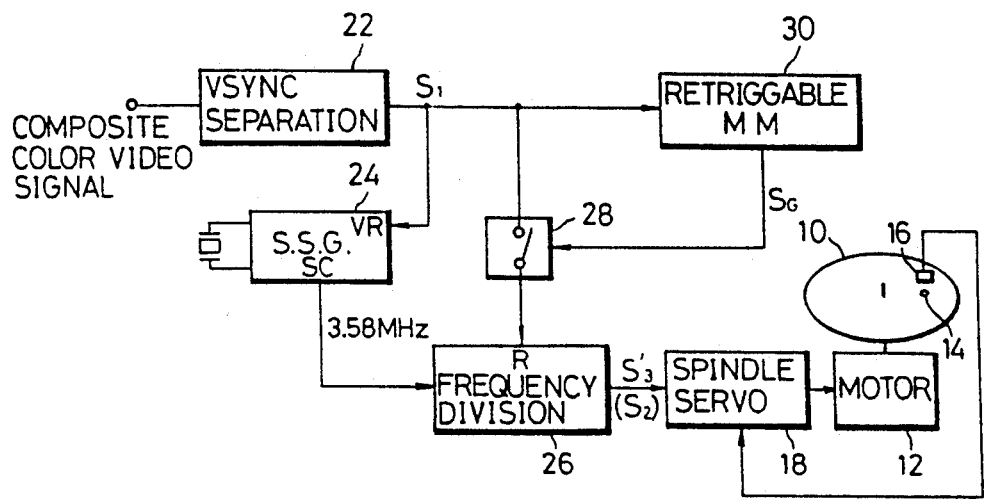
FIG. 1
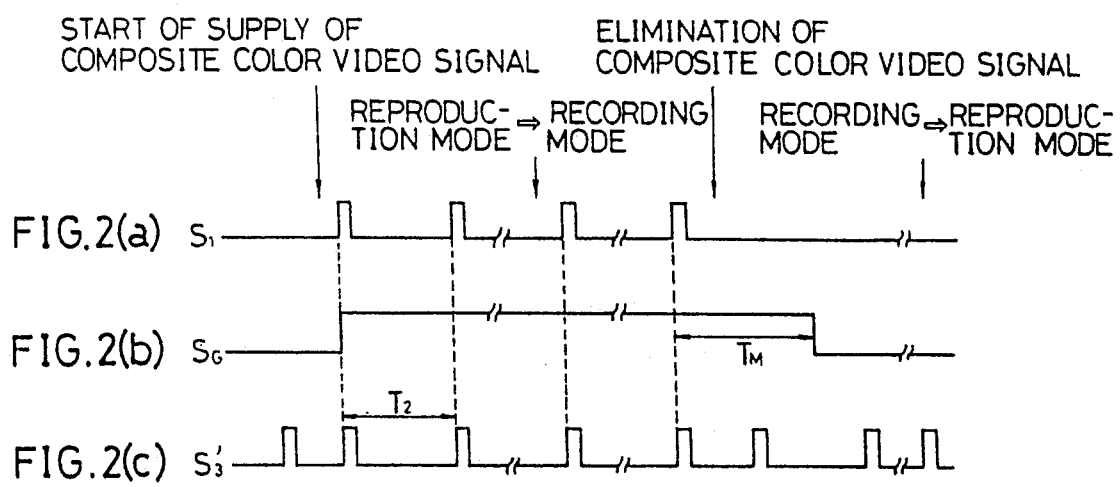

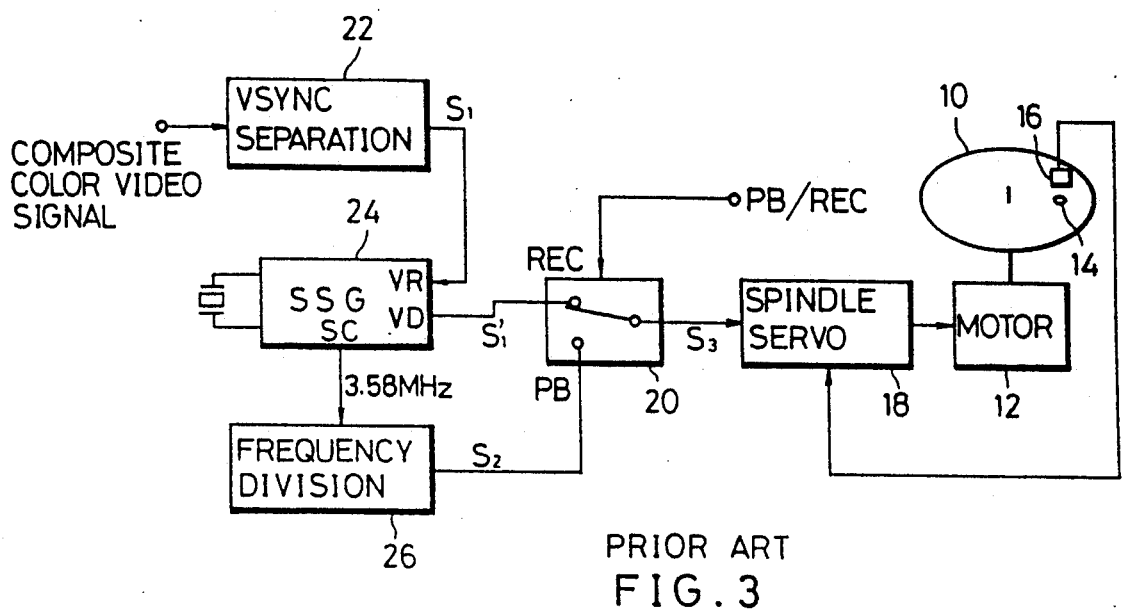
PRIOR ART
FIG. 3
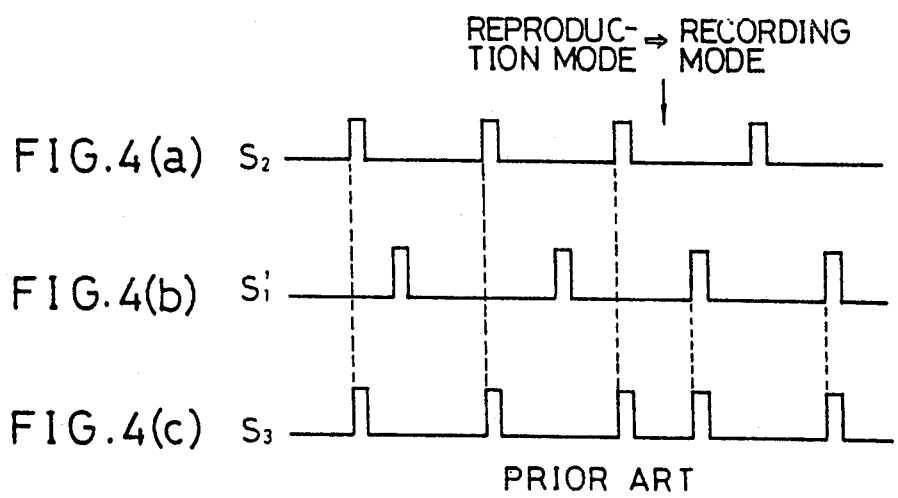
PRIOR ART

ROTATION CONTROL APPARATUS FOR USE WITH RECORDING MEDIUM

This application is a continuation of application Ser. No. 07/769,052, filed Dec. 26, 1990, now abandoned; which is a continuation of U.S. Ser. No. 07/238,532 filed Aug. 31, 1988, now abandoned.

BACKGROUND OF THE INVENTION

1. Field of the Invention

The present invention relates generally to a rotation control apparatus suitable for use with a recording medium such as a magnetic or optical type of disk and, more particularly, to a rotation control apparatus for providing servo control over the rotation of such a recording medium which allows signals to be read thereto or written therefrom.

2. Description of the Related Art

For example, in a typical electronic still camera, rotation control is provided as shown in FIG. 3. As illustrated, a magnetic disk 10 is caused to rotate by a motor 12, and a PG coil 16 is adapted to detect the presence or absence of a small magnet 14 attached to one side of the magnetic disk 10. If the PG coil 16 detects the presence of the small magnet 14, the PG coil 16 supplies a PG pulse as a feedback signal to one input of a spindle servo-circuit 18, at which time a reference signal $S_3$ is supplied to another input of the spindle servo-circuit 18. The spindle servo-circuit 18 controls the operation of the motor 12 so that the phase difference between the PG pulse and the reference signal $S_3$ may be kept constant.

In this state, if a recording mode is selected by operating a switch (not shown), an analog switch 20 is switched to a REC position, and a vertical-synchronizing-signal separating circuit 22 separates an external vertical synchronizing signal $S_1$ from a composite color video signal. The external vertical synchronizing signal $S_1$ is supplied to the reset terminal VR of a synchronizing-signal generator 24 and thus a vertical synchronizing signal $S'_1$ whose phase has been reset by the external vertical synchronizing signal $S_1$ is supplied as the aforesaid reference signal $S_3$ from the output terminal VD of the synchronizing-signal generator 24 to the spindle servo-circuit 18 through the analog switch 20 which is switched to the REC position.

On the other hand, if a reproduction mode is selected by operating the switch (not shown), the analog switch 20 is switched to a PB position, and a subcarrier of 3.58 MHz is supplied from the synchronizing-signal generator 24 to a frequency division circuit 26. The frequency division circuit 26 effects the frequency division of this 3.58-MHz subcarrier and outputs an internal vertical synchronizing signal $S_2$. This signal $S_2$ is also supplied as the aforesaid reference signal $S_3$ to the spindle servo-circuit 18 through the analog switch 20 which is switched to the PB position.

In this fashion, the magnetic disk 10 is rotated on the basis of the external vertical synchronizing signal $S_1$ during recording, while, during reproduction, the magnetic disk 10 is rotated on the basis of the internal vertical synchronizing signal $S_2$.

In such a related art electronic still camera, however, switching between the production and recording modes involves the following problems.

If the reproduction mode is switched to the recording mode, the period of the reference signal $S_3$ abruptly varies as shown in FIGS. 4(a) to 4(c), since the vertical synchronizing signals $S'_1$ and $S_2$ differ in phase from each other. It is impossible, therefore, to initiate recording until servo-control reaches its stable state.

On the other hand, if the recording mode is switched to the reproduction mode, the period of the reference signal $S_3$ likewise varies abruptly and it is impossible to perform proper reproduction until servo-control reaches the stable state.

SUMMARY OF THE INVENTION

It is, therefore, an object of the present invention to provide a rotation control apparatus suitable for use with a recording medium, which is capable of effecting proper recording or reproduction even immediately after one of the reproduction and recording modes has been switched to the other.

To achieve the above and other objects, in accordance with the present invention, there is provided a rotation control apparatus for controlling the rotation of a recording medium. The rotation control apparatus includes a motor for imparting a rotary motion to a recording medium; a pulse generator arranged to detect the rotation of the recording medium and then to output a pulse of frequency proportional to the rotational speed of the recording medium; a servo circuit arranged to receive as its input a reference pulse and the aforesaid pulse output from the pulse generator and then to cause the motor to rotate so that the phase difference between the reference pulse and the pulse output from the pulse generator may be kept constant; an internal-vertical-synchronizing-signal generating circuit having a reset terminal, the internal-vertical-synchronizing-signal generating circuit being arranged to supply an internal vertical synchronizing signal of predetermined frequency to the servo circuit as the reference pulse if no reset signal is supplied to the reset terminal and, if a reset signal is supplied to the reset terminal, to cause the phase of the internal vertical synchronizing signal to coincide with the phase of the reset signal, the phase of the internal vertical synchronizing signal being a phase which is present when the reset signal is supplied to the reset terminal; an external-vertical-synchronizing-signal separating circuit arranged to receive a composite video signal as its input to separate an external vertical synchronizing signal from the composite video signal, thereby outputting the external vertical synchronizing signal; and reset-signal supplying means for supplying the separated external vertical synchronizing signal to the reset terminal of the internal-vertical-synchronizing-signal generating circuit.

In the rotation apparatus according to the present invention, if no composite video signal is supplied to the external-vertical-synchronizing-signal separating circuit, no reset pulse is supplied to the reset terminal of the internal-vertical-synchronizing-signal generating circuit which, in turn, outputs an internal vertical synchronizing signal of accurate period. This signal is supplied to the servo-circuit as a reference signal, whereby the operation of the recording-medium rotating motor is servo-controlled so that the phase difference between the reference pulse and the pulse from the pulse generator may be kept constant.

If the composite video signal is supplied to the external-vertical-synchronizing-signal separating circuit, the external vertical synchronizing signal is separated from the composite video signal and supplied to the reset terminal of the internal-vertical-synchronizing-signal generating circuit. Thus, the phase of the internal vertical synchronizing signal is made coincident with the phase of the external vertical synchronizing signal. The resultant internal vertical synchronizing signal is supplied to the servo-circuit as the reference pulse.

Switching from the reproduction mode to the recording mode is performed necessarily after the composite video signal has been supplied to the external-vertical-synchronizing-signal separating circuit. Therefore, although the period of the reference signal abruptly varies upon initiation of the supply of the composite video signal, the servo control reaches to its stable state before the switching from the reproduction mode to the recording mode. Accordingly, it is possible to perform recording even immediately after the switching to the recording mode has been performed.

The switching from the recording mode to the reproduction mode is performed after the supply of the composite video signal to the external-vertical-synchronizing-signal separating circuit has been stopped. Therefore, although the servo control is unstable immediately after the stop of the supply, it reaches the stable state by the time that the aforesaid switching is performed. Accordingly, it is possible to achieve proper reproduction even immediately after the switching. Also, if the composite video signal continues to be supplied to the external-vertical-synchronizing-signal separating signal after the switching, servo control during reproduction is also provided by the internal vertical synchronizing signal equivalent to the external vertical synchronizing signal. Accordingly, it is possible to ignore fluctuations in the period of the reference signal and hence to achieve proper reproduction even immediately after switching from the recording mode to the reproduction mode.

Accordingly, in accordance with the present invention, it is possible to effect proper recording or reproduction even immediately after one of the reproduction and recording modes has been switched to the other.

The above and other objects and features of the invention will become apparent from the following detailed description of an embodiment thereof taken in connection with the accompanying drawings.

BRIEF DESCRIPTION OF THE DRAWINGS

FIG. 1 is a block diagram of one preferred embodiment of the present invention, and shows the construction of the essential portion of a servo system for a disk rotating motor;

FIGS. 2(a) to 2(c) are graphic representations showing how the waveform of a reference signal varies by switching between the reproduction mode and the recording mode in the embodiment shown in FIG. 1;

FIG. 3 is a block diagram similar to FIG. 1, but shows the construction of the essential portion of a conventional servo system for a disk rotating motor; and FIGS. 4(a) to 4(c) are graphic representations showing how the waveform of a reference signal varies by switching between the reproduction mode and the recording mode in the conventional example shown in FIG. 3.

DESCRIPTION OF THE PREFERRED EMBODIMENT

One preferred embodiment of the present invention will be described below with reference to FIGS. 1 and 2(a) to 2(c) in which like reference numerals are used to denote the like or corresponding portions shown in FIGS. 3 through 4(c).

FIG. 1 shows a rotation servo system associated with the motor 12 for rotating the magnetic disk 10. Although not shown, a plurality of tracks are concentrically formed over the magnetic disk 10, and a still picture corresponding to one field can be recorded on each of the tracks.

The illustrated rotation servo system includes the PG coil 16 for detecting the presence or absence of the small magnet 14 attached to one side of the magnetic disk 10, the spindle servo-circuit 18 arranged to control the operation of the motor 2 so as to receive the PG pulse from the PG coil 16 when a predetermined time period has elapsed after the spindle servo-circuit 18 has received the reference signal $S_3'$, the vertical-synchronizing-signal separating circuit 22 for separating the external vertical synchronizing signal $S_1$ from an input composite color video signal, the synchronizing signal generator 24 for outputting a 3.58-MHz subcarrier SC and a vertical synchronizing signal whose phase has been reset by the external synchronizing signal $S_1$ supplied to the reset terminal VR (this vertical synchronizing signal is used in another circuit which is not shown since it is not related to the present invention) and the frequency division circuit 26 for frequency-dividing such a subcarrier and outputting the internal vertical synchronizing signal $S_2$ of field frequency (60 Hz). The frequency division circuit 26 is arranged such that, if a reset pulse is supplied to its reset terminal R, the phase of the pulse output from this circuit 26 at the time of this pulse supply coincides with that of the reset pulse. Also, the illustrated rotation servo system includes an analog switch 28 and a retriggable multivibrator 30 for outputting a pulse having a pulse width $T_M$ greater than the period $T_2$ of the internal vertical signal $S_2$. (Refer to FIG. 2.)

The synchronizing signal generator 24 and the frequency division circuit 26 constitute an internal-vertical-synchronizing-signal generating circuit.

The following is a description of the operation of the presently preferred embodiment.

If no composite color video signal is supplied to the vertical-synchronizing-signal separating circuit 22, the retriggable multivibrator 30 is not triggered. Therefore, the analog switch 28 is open and the reset input terminal R of the frequency division circuit 26 is at its low level. Thus, the subcarrier SC output from the synchronizing-signal generator 24 is frequency-divided by the frequency division circuit 26, and the resultant internal vertical synchronizing signal $S_2$ of accurate period is supplied to the spindle servo-circuit 18 as a reference signal $S_3'$, whereby the operation of the motor 12 is servo-controlled so that the phase difference between the reference signal $S_3'$ and the PG pulse of the PG coil 16 may be kept constant.

If the composite color video signal is supplied to the vertical-synchronizing-signal separating circuit 22, the external vertical synchronizing signal $S_1$ is separated from the composite color video signal. The retriggable multivibrator 30 is triggered by the front edge of the external vertical synchronizing signal $S_1$ to output a gate control signal $S_G$ to the analog switch 28, thereby closing the analog switch 28. Thus, the external vertical synchronizing signal $S_1$ is supplied to the reset input terminal R of the frequency division circuit 26, and the phase of the output pulse of the frequency division circuit 26 is made coincident with the phase of the external vertical synchronizing signal $S_1$, that is, the output pulse is put in phase with the external vertical synchronizing signal S₁. (Refer to FIGS. 2(a) to 2(c).)

In this embodiment, switching from the reproduction mode to the recording mode is performed necessarily after the composite color video signal has been supplied to the vertical-synchronizing-signal separating circuit 22. Therefore, although the period of the reference signal S'₃ abruptly varies as shown in FIG. 2(c), when supply of the composite color video signal is initiated, the servo control reaches to its stable state before switching from the reproduction mode to the recording mode. Accordingly, it is possible to perform recording even immediately after the switching to the recording mode has been done.

Switching from the recording mode to the reproduction mode is performed after supply of the composite color video signal to the vertical-synchronizing-signal separating circuit 22 has been stopped as shown in FIG. 2(a). Therefore, although the servo control is unstable immediately after the stop of the supply, it reaches the stable state by the time that such switching is performed. Accordingly, it is possible to achieve proper reproduction even immediately after the switching. Also, if the composite color video signal continues to be supplied to the vertical-synchronizing-signal separating circuit 22 after the switching, servo control during reproduction is also provided by the external vertical synchronizing signal S₁. Accordingly, it is possible to ignore fluctuations in the period of the reference signal S₃' and hence to achieve proper reproduction even immediately after the switching from the recording mode to the reproduction mode.

In the above-described embodiment, a magnetic type of disk is used as the recording medium for the purpose of illustration only, and the kind of recording medium is not limited solely to such a magnetic disk. It is of course possible to employ any type of recording medium which allows information signals to be read thereto or therefrom during rotation.

The synchronizing-signal generator 24 and the frequency division circuit 26 may be integrally formed by a single IC.

In addition, the analog switch 28 and the retriggable multivibrator 30 may be omitted and the external vertical synchronizing signal S₁ may be supplied directly to the reset input terminal R of the frequency division circuit. In this case, a very simple arrangement can be achieved.

What is claimed is:

1. A rotation control apparatus for controlling the rotation of a recording medium, wherein an internal synchronizing signal from a synchronizing signal generating means, or an external synchronizing signal being separated from a recording signal, is supplied to a servo circuit as a reference signal; and a motor for rotating said recording medium is controlled by said servo circuit; comprising:

an output terminal of said synchronizing signal generating means connected to a reference signal input terminal of said servo circuit; wherein, when said recording signal is supplied, said external synchronizing signal being separated from said recording signal is supplied to a reset terminal of said synchronizing signal generating means, so that a phase of said internal synchronizing signal coincides with a phase of said external synchronizing signal.

2. A rotation control apparatus according to claim 1 said recording medium comprising a magnetic disk.

3. A rotation control apparatus according to claim 2 wherein the magnetic disk is used in an electronic camera.

4. A rotation control apparatus according to claim 1, wherein said synchronizing signal generating means comprises:

a synchronizing-signal generator for outputting a subcarrier of predetermined frequency.

5. A rotation control apparatus according to claim 4, wherein said synchronizing signal generating means further includes:

a frequency divider having a reset terminal and arranged to frequency-divide said subcarrier supplied from said synchronizing-signal generator to produce said internal synchronizing signal.

6. A rotation control apparatus according to claim 1, further comprising:

external synchronizing signal separating means for receiving a video signal as an input, for separating an external synchronizing signal from said video signal, and outputting said external synchronizing signal.

7. A rotation control apparatus according to claim 1, further comprising:

reset signal supplying means for supplying said separated external synchronizing signal to said reset terminal of said synchronizing signal generating means.

8. A rotation control apparatus according to claim 7, wherein said reset signal supplying means includes:

a retriggerable monostable multivibrator arranged to receive, as a trigger signal, said external synchronizing signal, and to be triggered to output a pulse having a pulse width greater than the period of said internal synchronizing signal.

9. A rotation control apparatus according to claim 8, wherein said reset signal supplying means further includes:

a switch for allowing or cutting off the connection between said external synchronizing signal and said reset terminal in accordance with the output level of said retriggerable monostable multivibrator.

* * * * *